US007343299B2

(12) United States Patent
Algazi

(10) Patent No.: US 7,343,299 B2
(45) **Date of Patent: *Mar. 11, 2008**

(54) SYSTEM AND METHODS FOR MAIL SECURITY

(75) Inventor: Allan Stuart Algazi, Succasunna, NJ (US)

(73) Assignee: Symbol Technologies, Inc., Holtsville, NY (US)

( * ) Notice: Subject to any disclaimer, the term of this patent is extended or adjusted under 35 U.S.C. 154(b) by 1170 days.

This patent is subject to a terminal disclaimer.

(21) Appl. No.: 10/033,042

(22) Filed: Dec. 27, 2001

(65) Prior Publication Data

US 2002/0083022 A1 Jun. 27, 2002

Related U.S. Application Data

(63) Continuation-in-part of application No. 09/759,566, filed on Jan. 11, 2001.

(60) Provisional application No. 60/246,222, filed on Nov. 6, 2000.

(51) Int. Cl.
*G06Q 10/00* (2006.01)

(52) U.S. Cl. .......................................................... 705/1

(58) Field of Classification Search ..................... 705/1
See application file for complete search history.

(56) References Cited

U.S. PATENT DOCUMENTS

| | | | | |
|---|---|---|---|---|
| 5,647,017 A | | 7/1997 | Smithies | 382/119 |
| 5,838,812 A | * | 11/1998 | Pare et al. | 382/115 |
| 5,869,819 A | * | 2/1999 | Knowles et al. | 235/375 |
| 5,872,834 A | * | 2/1999 | Teitelbaum | 379/93.03 |
| 6,028,517 A | | 2/2000 | Sansone | 340/569 |
| 6,069,969 A | | 5/2000 | Keagy | 382/124 |
| 6,070,793 A | | 6/2000 | Reichl | 181/135 |
| 6,114,959 A | | 9/2000 | Bennett | 340/569 |

(Continued)

FOREIGN PATENT DOCUMENTS

WO WO 96/03286 * 2/1996

(Continued)

OTHER PUBLICATIONS

E-Stamp Adds Prominent Microsoft VP and E-Commerce Strategist to Board of Directors, Aug. 2, 2000, PR Newswire, pp. 1-3.*

(Continued)

*Primary Examiner*—Jamisue Plucinski
(74) *Attorney, Agent, or Firm*—Fay Kaplun & Marcin, LLP.

(57) ABSTRACT

A method of securing the mails is described. Using a mail information retrieval system and a the use of data-rich, machine readable barcodes to make each mailing piece unique by including data that 'lives' with the mail piece or package allows mail to become traceable. Since traceable mail is less likely to become tainted, resources may be focused on mail that is not traceable.

22 Claims, 8 Drawing Sheets

U.S. PATENT DOCUMENTS

| | | | | |
|---|---|---|---|---|
| 6,256,737 | B1 * | 7/2001 | Bianco et al. | 713/186 |
| 6,323,782 | B1 | 11/2001 | Stephens | 340/825.31 |
| 6,439,345 | B1 | 8/2002 | Reckentenwald | 185/55 |
| 6,802,005 | B1 | 10/2004 | Berson | 713/178 |
| 2002/0107820 | A1 | 8/2002 | Huxter | 705/402 |
| 2003/0081860 | A1 * | 5/2003 | Danielson et al. | 382/313 |

FOREIGN PATENT DOCUMENTS

| | | |
|---|---|---|
| WO | WO 03/036861 | 5/2002 |

OTHER PUBLICATIONS

Data strip Uses 200-MHz Hitachi SuperH 32-bit RISC Microprocessor in its DSVERIFY2D Barcode/Fingerprint Reading Device, which Reduces Fraud and Security Breaches in Identity Card, Passport and Other Authentication Applications, Oct. 4, 2000, Business Wire, pp. 1-3.*

"Providing Visual and Audio Feedback for Recognition Events;" IBM Technical Disclosure Bulletin, Jan. 1, 1996; vol. 39; Issue 1; pp. 75-76.

* cited by examiner

FIG. 4

MIRS RECEIPT

Dear Mr. Jones:

Your Package Has Arrived!

Shipped By: Symbol Technologies, Inc.
One Symbol Plaza
Holstville, NY 11742-1300

Contents: 5 Spectrum 24 11 Megabit Wireless LAN Cards

Package Location: MIRS Central
One Ohio Road
Anywhere, OH 22222

Instructions:

1. Go to the MIRS Location
2. Sign in the space indicated
3. Allow the MIRS to scan your signature and the bar code
4. Retrieve your package Scan Below AND Scan Below Sign Here

DO NOT SIGN UNTIL YOU HAVE ARRIVED AT THE MIRS!

FIG. 4A

MIRS RECEIPT

Dear Mr. Jones:

Your Package Has Arrived!

| | |
|---|---|
| **Shipped By:** | **Symbol Technologies, Inc.**<br>**One Symbol Plaza**<br>**Holstville, NY 11742-1300** |
| **Contents:** | **5 Spectrum 24 11 Megabit Wireless LAN Cards** |
| **Package Location:** | **MIRS Central**<br>**One Ohio Road**<br>**Anywhere, OH 22222** |

Instructions:

1. Go to the MIRS Location
2. Sign in the space indicated
3. Allow the MIRS to scan your signature and the bar code
4. Retrieve your package

Scan Below AND Scan Below

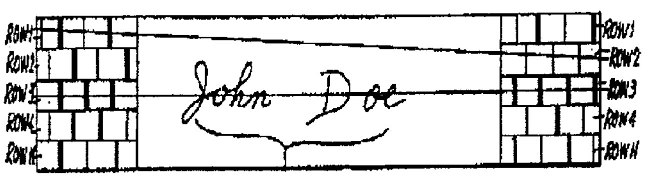

Sign In The Space Above

DO NOT SIGN UNTIL YOU HAVE ARRIVED AT THE MIRS!

Figure 7
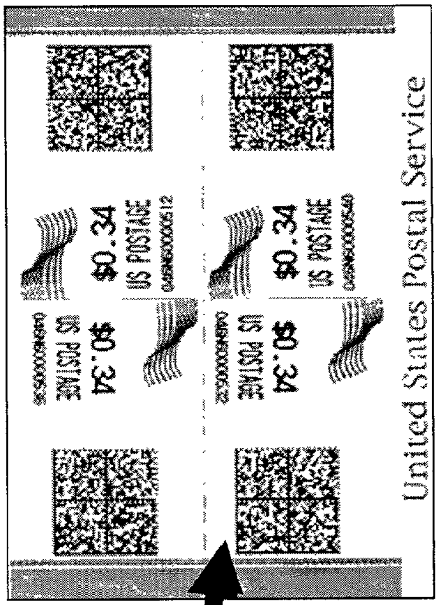

SYSTEM AND METHODS FOR MAIL SECURITY

REFERENCE TO RELATED APPLICATIONS

This application is a continuation-in-part of U.S. Ser. No. 09/759,566, filed Jan. 11, 2001, which claims the benefit of provisional application U.S. Ser. No. 60/246,222, filed Nov. 6, 2000.

BACKGROUND OF THE INVENTION

The present invention relates to an improved system for transportation and delivery using bar codes to uniquely identify customers and delivered goods in a secure and quick manner.

The Internet has produced a proliferation of e-commerce transactions. While e-commerce transactions offer convenience and speed to customers seeking to purchase goods online, most e-commerce transactions must end with the physical delivery of goods to a consumer. Indeed, the delivery stage is particularly prone to error or sabotage as goods may be inadvertently or maliciously routed to the wrong destination. The ability to secure the delivery of goods to the consumer in a manner that inspires confidence in both parties would be of great benefit to both providers of goods and the consumers who use them.

This need has only grown in importance since the terrorist attacks in the United States on Sep. 11, 2001, and the anthrax attacks on the mails that occurred in the months thereafter. Under the current postal system, most mail cannot be reliably traced back to its point of entry within the postal system. This allows terrorists to use the anonymity of the mails to wreak havoc on the mail system, which is the linchpin of a functioning U.S. economy. According, the ability to reliably trace mail in a manner that is easy to implement and impervious to tampering would greatly increase the security of the mails and the confidence of the public in the system.

SUMMARY OF THE INVENTION

Therefore, the proposals of the related art fail to comprehensively overcome the problems discussed above and other related problems. Advantages of this invention will be set forth in part in the description which follows, and in part will be obvious from the description, or may be learned by practice of the invention. The advantages of the invention will be realized and attained by means of the elements and combinations particularly pointed out in the appended claims.

The present invention provides an improved method for the handling of packages and other e-commerce transactions using bar code technology and, in particular, the use of the security features available in two-dimensional bar codes, such as, for example, PDF-417, which was developed by Symbol Technologies, Inc., the assignee of the present invention. In further embodiments, the security of a transaction is assured by using the ability of a two-dimensional bar code to reliably verify the identity of a participant in the transaction by comparing biometric data provided by the user in a one-time secure transaction (which is recorded within the two-dimensional bar code) and biometric data provided by the user of the system just prior to entering a transaction. These actions may also be used to reliably trace where a particular piece of mail entered the mail system and what happened to that piece of mail thereafter.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 4 illustrates a sample receipt that may be used in practicing an embodiment of the present invention.

FIG. 4A illustrates another form of a sample receipt that may be used in practicing an embodiment of the present invention.

FIG. 7 illustrates a method of procuring a plurality of secure digital stamp that may be used in practicing an embodiment of the present invention.

DETAILED DESCRIPTION OF THE EMBODIMENTS

Figure 1:
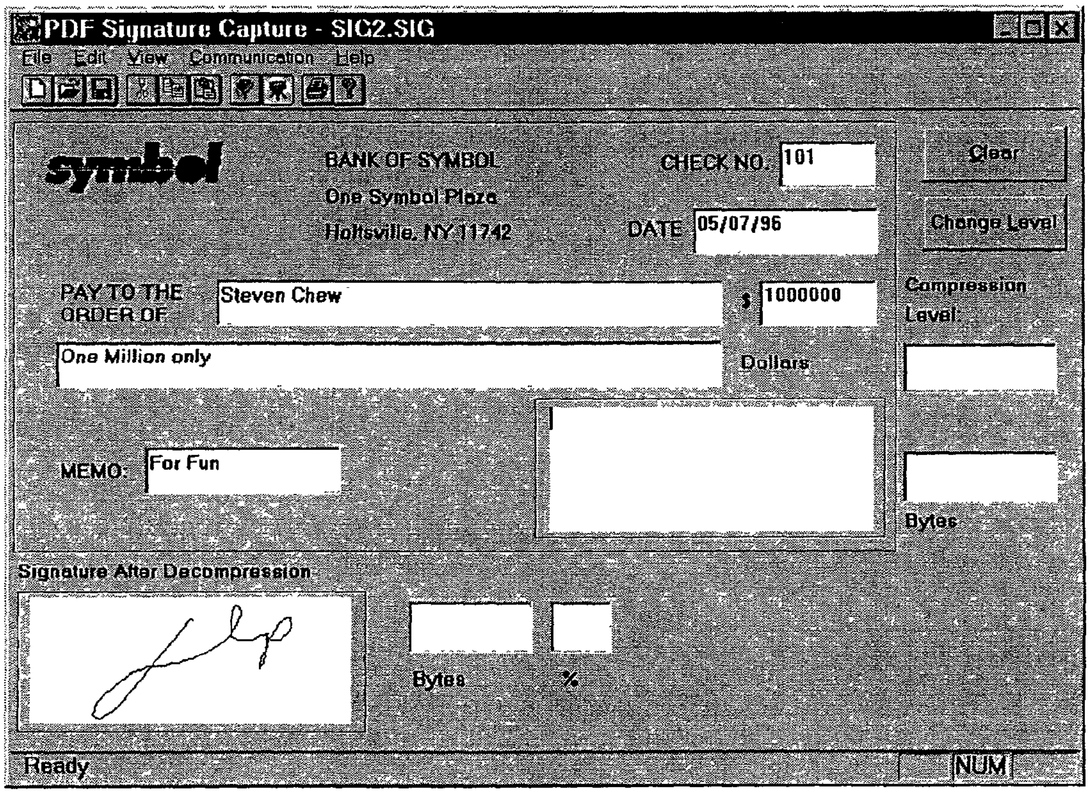
FIG. 1 illustrates a computer program capable of printing a check with a two-dimensional bar code.

Reference will now be made in detail to the embodiments of the invention, examples of which are illustrated in the accompanying drawings.

The proper identification of a party in a proposed transaction of goods, information or services may be ascertained by the use of a two-dimensional bar code. The need to encode more information in a smaller space has driven the development, standardization, and growing use of two-dimensional bar codes. Where traditional one-dimensional bar codes act as a pointer to reference information stored in a database, two-dimensional codes can function as the database itself, and therefore assure complete portability for two-dimensional labeled items.

For example, PDF417, or Portable Data File 417, is a two-dimensional stacked bar code symbology capable of encoding over a kilobyte of data per label. The "portable data file" approach is well suited to applications where it is impractical to store item information in a database or where the database is not accessible when and where the item's bar code is read In addition, PDF417 is an error-correcting symbology designed for real-world applications where portions of labels can get destroyed in handling. It performs error correction by making calculations, if necessary, to reconstruct undecoded or corrupted portions of the symbol. A user may define one of 9 error correction levels labelled levels 0 to 8. All error correction levels, except Level 0, not only detect errors but also can correct erroneously decoded or missing information.

PDF 417 also has the feature of Macro PDF417. This mechanism allows files of data to be represented logically and consecutively in a number of 'PDF417' symbols. Up to 99,999 different PDF417 symbols can be so linked or concatenated and be scanned in any sequence to enable the original data file to be correctly reconstructed. In particular, PDF417 has been demonstrated to be effective in communicating large data files and to be easily scannable with existing proven hand-held technologies. Successful installations and broad supplier support further supported its selection. Detailed decision factors included:

Demonstrated robust error correction

Demonstrated to be readable with a wide range of scanner technologies including laser, linear CCD and imagers Demonstrated robust non-contact reading performance Best backward compatibility with the scanning of one-dimensional bar codes in existing applications.

Proven track record and field performance.

Based on the versatility of the two-dimensional bar code, it is possible to use the code as a key to access information. For example, a consumer desiring certain information or goods from a provider presents a bar code previously obtained from the provider which encodes information about the consumer that only the consumer himself or herself can verify. If the provider matches the information from the bar code with the information presently provided characteristics of the user, the provider can allow access to the desired information or goods without fear that a fraud or mistake has taken place.

Figure 2:
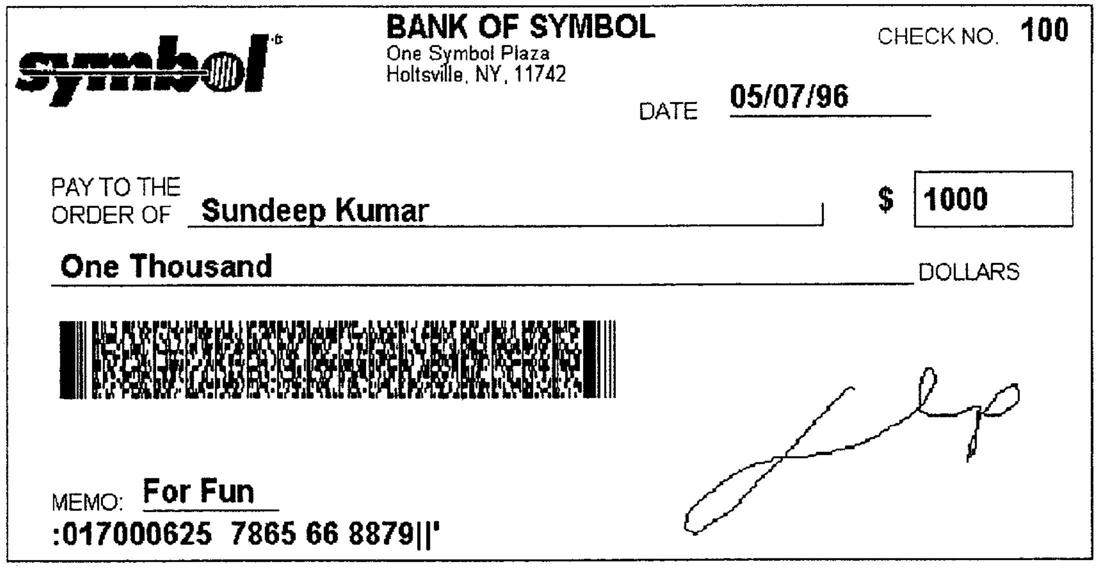
FIG. 2 illustrates a check incorporating a two-dimensional bar code that includes signature information printed using a computer program.

For example, as illustrated in FIG. 1, a computer program is used to generate a request to print a check. The user inputs the requisite information including his or her signature using, for example, a pen tablet. The computer program then prints a check similar to the form in FIG. 2, which includes information about the user's signature and other pertinent data encoded in the PDF 417 bar code on the check. The user then may sign the check in the normal fashion in the lower right hand corner. Upon receipt, the bank may verify the authenticity of the signature by scanning both the PDF 417 bar code and the signature and comparing them. If they are substantially identical, the authenticity is verified. This concept can be expanded to include any type of biometric data such as facial appearance, signatures, thumbprints, handprints, voice prints and retinal scans and any type of transaction where a secure and inexpensive method of authentication is desired by each party.

In an embodiment of the present invention, a Mail Item Retrieval System (MIRS) may be utilized. There are 38,000 retail postal locations and an unlimited number of non-USPS commercial sites where MIRS can be located. The MIRS provides customers with the freedom to pick up their package 24 hours a day, seven days a week. In a further embodiment, the MIRS may be located at a user's home or place of business.

The MIRS is based on the concept that each user need only provide select biometric data to the MIRS provider once in a secure fashion. At this time, the user also provides his or her location information which may include the user's address, phone numbers and e-mail contacts. The user may also provide financial information to the MIRS, such as a credit card number. This biometric data is then stored into the MIRS to be encoded into future two-dimensional bar codes provided to the user in electronic format and thereafter printed by the user on his or her personal printer. The MIRS may also provide security guarantees that creates a firewall between the biometric information.

Once an account is established with MIRS, the user may direct that providers of goods send merchandise purchased over the phone or Internet to his or her mailbox account with the MIRS. Providers of goods and services may also interact with the MIRS provider.

Figure 3:
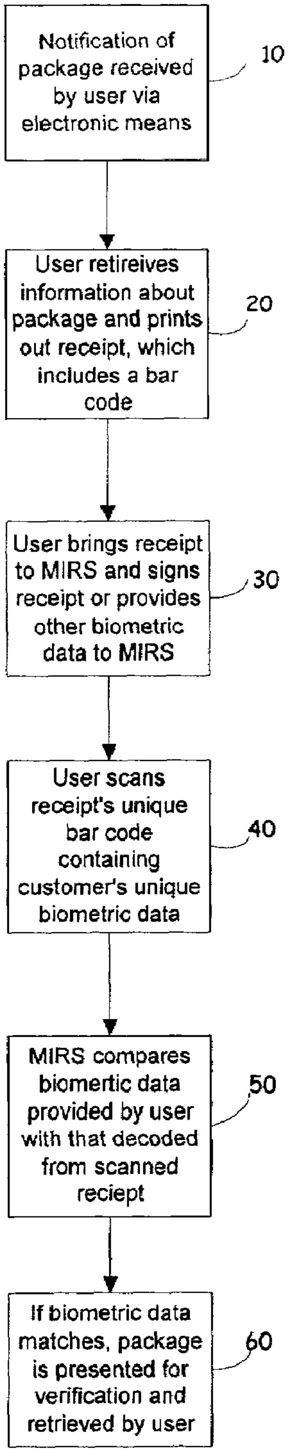
FIG. 3 illustrates in flowchart form a method of practicing an embodiment of the present invention.

Turning now to FIG. 3, shown is a flowchart of using the MIRS, which is an embodiment of the present invention. In step 10, a user receives notification of a package's arrival at the MIRS facility. Such a notification could occur via voicemail, electronic mail, a cell phone, a pager or a PDA. The notification will include an attachment for printing an appropriate receipt. In step 20, the user at his or her convenience retrieves the information about the package received and in particular obtains a printed copy of a receipt including such information. The receipt will include a two-dimensional bar code, such as a PDF, which will incorporate information provided by the user to identify himself or herself previously to the system.

The bar code on the receipt may contain biometric data that is a unique to the user and that has been previously provided in a secure manner to the entity providing the notification service. Such biometric data may include, for example, voice-print fingerprint, hand-print, retinal scan information, signature information, facial features or any other unique identifying features about the user. As shown in FIG. 4, the printed receipt obtained may also include information necessary for the user to obtain the package. Such information may include the nature of the package, the dimensions of the package and the location where the package currently resides. The security of the MIRS is guaranteed by the fact that the receipt cannot be used to retrieve the package from the MIRS unless and until it is countersigned by the correct user. If anyone other than the correct user attempts to sign the receipt and retrieve the package, the MIRS will not release the package because the biometric signature information contained in the two-dimensional bar code and the signature will not match. This security technique may also be used for other biometric data.

Returning to FIG. 3, in step 30, the user brings the printed receipt to the location of the package, at this location the user then provides the required biometric data to the package provider. For example, the user may affix his or her signature on the printed receipt just prior to arriving at the package retrieval facility. As show in step 40, at the package retrieval facility which may be at a post office or other central location or even the user's home, the user has the MIRS scan the two-dimensional bar code and also provides the necessary biometric data to the retrieval system. The act of providing such data may be accomplished by signing the receipt in the space indicated and having the MIRS scan the signature or by providing a retinal scan, handprint, finger print or voice print to the MIRS. Alternatively, the MIRS could us a camera to scan the facial features of the user and compare the biometric data retrieved from the scan with the biometric data retrieved from scanning the two-dimensional bar code.

In step 50, the MIRS compares the previously obtained biometric data encoded in the two-dimensional bar code with the currently obtained biometric data provided by the user. If the two sets of data match, the retrieval system then provides the package to the user. As shown in step 60, the retrieval system may present the user with the package in order for the user to confirm that that is the actual package that is desired. In a further embodiment, the MIRS can arrange that the provider of the goods only charge the user's credit card once the user has actually retrieved the package. This can be accomplished without having the MIRS reveal the user's financial information to the provider.

In a further embodiment, the MIRS may employ the signature-capture system using electro-optical scanning as disclosed in U.S. Pat. No. 5,138,140, which is hereby incorporated by reference in its entirety. Two-dimensional information such as a written signature can be captured and subsequently reconstructed by using an electro-optical scanner. A multi-row preamble code and a multi-row postamble code flank the signature, and each code has a row identifier for identifying which row is being scanned by a scan line emitted by the scanner, as well as start/stop data for identifying when each scan line traverses the boundaries of a space containing the signature.

The occupied zones, i.e. those having parts of the signature, present a different light reflectivity to the scanner than the non-occupied zones, i.e. those having no parts of the signature. The occupied zones are akin to bars, while the non-occupied zones are akin to spaces of a UPC symbol. The occupied zones represent binary ones, and the non-occupied zones represent binary zeros. When a scan line of the scanner traverses a row of zones in the space, the occupied zones reflect less light than the non-occupied zones, and this light-variable information can be processed into data representative of the signature in a manner completely analogous to that are known in the art for processing a UPC symbol.

However, unlike a UPC symbol, which is one-dimensional and can be scanned and read by a scan line anywhere along its height (i.e. the transverse "Y" axis), a signature is two-dimensional since it contains different information in both the longitudinal ("X" axis) and the transverse ("Y" axis) directions. To decode a two-dimensional signature, it is further necessary to know which row of zones is being scanned by a particular scan line and also when each scan line enters and exits the space containing the signature.

The signature scanner uses a multi-row preamble code means, and a multi-row postamble code means, respectively located forwardly and rearwardly of the space as considered along the longitudinal direction. Each code means is a multi-tiered symbol structure having electro-optically scannable and readable encoded data arranged along the longitudinal and transverse directions. Each symbol structure can be a unique two-dimensional marking symbol structure, a tiered bar code, or a new symbol structure compatible with prevailing standard bar code symbology. As shown in FIG. 4A, each code means arranges its encoded data in a plurality of longitudinally—extending rows 1, 2, 3, 4 . . . N, where N is a substantially large enough number to provide adequate resolution of the signature. In theory, an infinite number of rows would provide the sharpest resolution, but, in practice, 25 rows are sufficient to provide an adequately resolved signature. The rows are tiered, i.e. stacked one above another, in the transverse direction. Each row of encoded data also includes synchronizing means, i.e. start/stop data, for identifying when each scan line traverses the anterior and posterior boundary lines of the signature space.

In a further embodiment, the scanning described above may be accomplished by the user using a device independent from the MIRS, such as, for example, a stand-alone portable scanning device or a scanner integrated into a cell phone, PDA, or pager.

The returns process is a large and looming problem for retailers, e-tailers, catalog companies and the USPS. The MIRS may be used in a similar manner for the return of packages to a provider. After notifying the provider of the goods that a return is desired, the provider can take the opportunity to ascertain why the user wishes to return the item. Such notification may be done by phone or over the Internet. Once the provider is notified, the provider can use the MIRS to electronically deliver a return receipt to the user. The user may then print the receipt, which will include a two-dimensional bar code including encoded biometric information of the user. The receipt may also include information about addressing the package for a return including the location of the MIRS, the address to which the package should be sent and postage return information. Such information may also be printed out as a separate mailing label, which may be affixed to the return package.

Similar to the acquisition process, the user brings the printed receipt to the MIRS. At this location the user then provides the required biometric data to the MIRS. For example, the user may affix his or her signature on the printed receipt just prior to arriving at the package retrieval facility. At the package deposit facility which may be at a post office or other central location or even at the user's home, the user scans the two-dimensional bar code and also provides the necessary biometric data to the retrieval system. The act of providing such data may be accomplished by signing the receipt in the space indicated and scanning the signature or by providing a retinal scan or handprint, fingerprint, voice print to the MIRS. Alternatively, the MIRS could use a camera to scan the facial features of the user and compare the biometric data retrieved from that scan with the biometric data retrieved from scanning the two-dimensional bar code. The user may then deposit the package in the MIRS in a secure manner.

In a further embodiment, the MIRS could analyze the returned package physical characteristics such as its size and weight to make a determination whether the goods to be returned are actually in the package. The MIRS would compare the measured physical characteristics of the package with those previously provided by the provider. If the analysis reveals that the actual package characteristics differ from the expected characteristics, the user at the MIRS could be given the opportunity to verify that the package actually contains the goods that are to be returned. If the analysis reveals that the actual package characteristics match the expected characteristics, the MIRS could arrange for the provider to immediately refund the purchase price by crediting the credit card of the user if the user has chosen to provide this information to the MIRS. Such a credit could be reversed by the MIRS if the provider later receives the package to find that the goods returned do not, in fact, match the goods expected.

The foregoing systems may also be used to further secure mailing throughout the postal system. Our postal system singularly represents a readily available distribution network for bio-terrorism. Estimates are that over 100 billion pieces of mail are delivered annually. The anthrax-laced mailings that occurred in the fall of 2001, reveal the lack of security in the system. In the current environment, the likelihood of anyone not receiving an item from a bulk mailing is small. In the United States alone, non-profit organizations send over 12 billion bulk mailings a year, producing an estimated response in donations of $50 billion.

Secure digital mail is a series of initiatives recommended by the Mailing Industry Task Force to link mail with complementary information channels to create value for the consumer, sender, and processor. Its principal applications are centered on the use of data-rich, machine readable barcodes to make each mailing piece unique by including data that 'lives' with the mail piece or package.

Secure digital mail may have the following features

Figure 5:
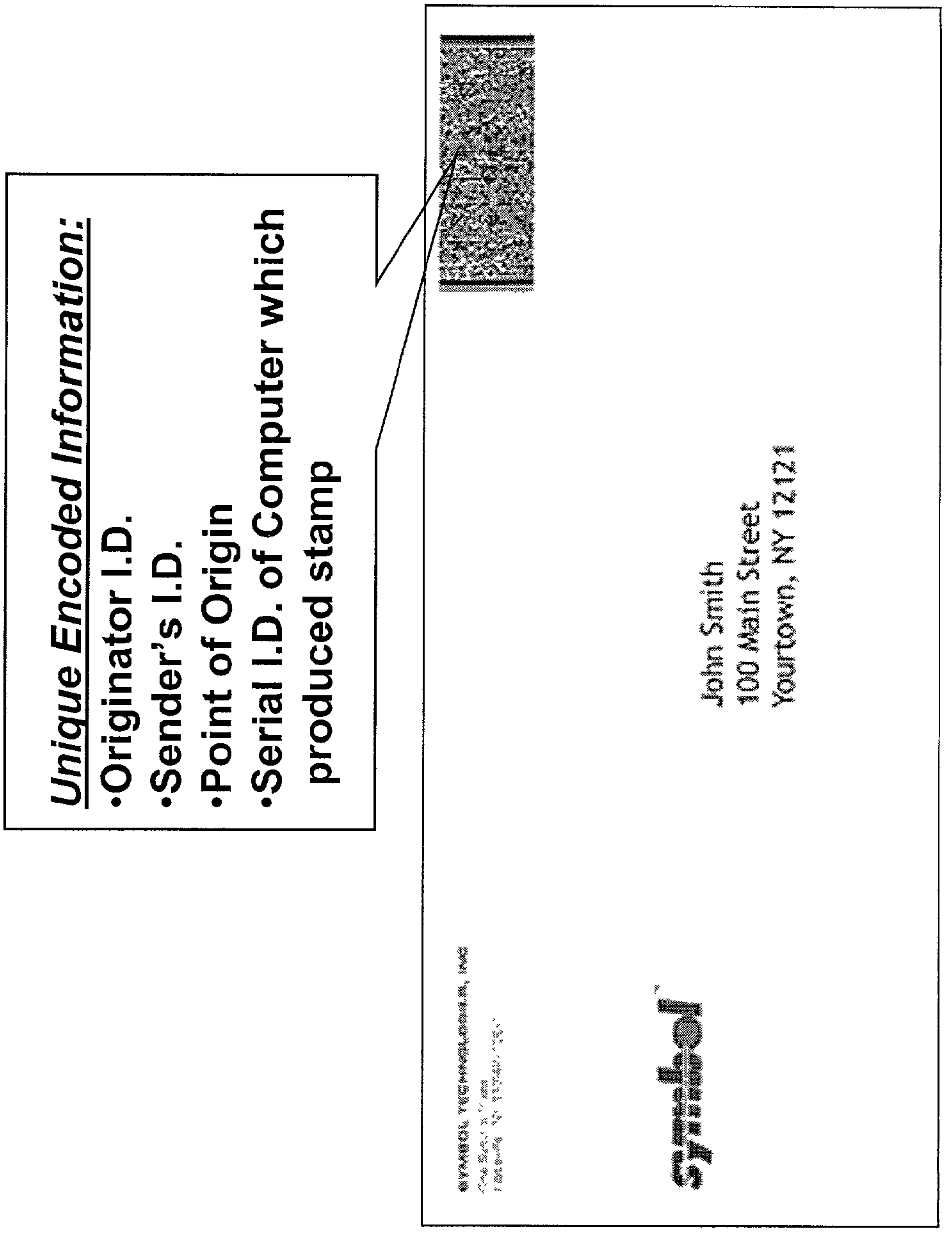
FIG. 5 illustrates a sample envelope with a form of a secure digital stamp that may be used in practicing an embodiment of the present invention.

Available at USPS retail counter, self-service kiosk, Postal carrier at home & with a home PC & printer;

- Digital Stamp info. including name, sender's address, mailing point of origin, payment method, biometric, etc;
- Pre-authorizes the senders . . . leaves a trail;
- Digitally secured & encrypted;
- Provides uniqueness & accountability . . . Automatically registers computer I.D. in the stamp;
- Uses USPS-approved Information Based Indicia Program, which provides
  - Postage Information
    - Amount., Date, Origination Zip Code, Destination Zip Code, class of mail:
  - Meter Information
    - Meter #, version #, manufacturer, etc.:
  - Validation Information
  - Digital Signature:
  - Identification
    - Sender Name:
    - Sender Address:
    - Destination Address:
    - Payment ID (credit card):
    - Biometric Data Turning to FIG. 5, shown is a sample envelope with such a digital stamp applied to an envelope. All critical sender information stored in secure digital mail's traveling portable data file database, removing any doubt regarding the letter's origin and mailing history. Credit card account # can be stored in Secure Digital Mail's indicia as an identifier. PDF-encoded driver's license or other official form of ID can be used for cash payment at the senders' door, at a MIRS or at the Post Office. Moreover, a Postal Carrier can provide mobile retail applications to customers via a magnetic stripe reader enabled handheld mobile computers.

In contrast, analog postage and stamps have little or no tractability. Cancellations, or 'postmarks' while having a legal status, don't confirm solid origination information as they merely indicate the time and location that a mail piece was inducted into regional processing centers. As in the case of the tainted mail sent to the US Senate in the fall of 2001, it may have gone through one of 46 local mail depots and then on to Trenton, N.J.'s regional postal center (where it was postmarked) before being shipped to Washington, D.C.

Postal Service experience and anecdotal evidence clearly point to anonymous and unaccountable mail as the primary threat among the 680 million letters carried by the USPS each day. By reducing anonymity and increasing accountability in the mails, secure digital mail will allow Postal Inspectors to focus more resources on "reasonable suspicion" threats. Its broad implementation at the post office; in corporate mailrooms; and at home, will help protect the postal system from terrorist threats by vetting and verifying the 99.9 percent of mail that is not a possible security breach. Secure digital mail will permit professionals to focus on the exceptions by allowing them to set the false alarm rate so low as to statistically preclude false negatives in the security screening process.

Mail carrying a traceable pre-printed and authorized mark or indicia is less vulnerable to contamination, since the use of these marks requires permission and registration with a postal authority plus stringent preparation requirements. Generally speaking, suspicious packages and letters use untraceable stamps, not meters; and customers who want their mail to be opened are more likely to use metering systems. The closer you get to linking identities of senders and points of origin in each mail piece, the higher the confidence level in the mail, and the fewer the opportunities for terrorists to commit acts of violence by exploiting postal systems.

Similar to the way data is communicated via the Internet; tracking systems (already in use by private delivery services like FedEx, UPS, and to a degree by postal services) would digitally encode and securely encrypt key details about a mail piece's origin and sender. These high-tech programs can turn packages and letters into 'intelligent mail', reducing the sender's anonymity and making the bad guys easier to root out. The fear of being caught is a powerful deterrent in itself.

Moreover, secure digital mail would provide a natural complement to the planned sanitization of uncontrolled mail, and a powerful digital deterrent to terrorism via the mail. Companies in the sanitizing business estimate that equipment installation costs for an existing mail facility are likely to run at about a penny per letter. With mail volume running at between 600 million and 700 million pieces per day, the costs add up quickly. Secure digital mail should be part of a total end-to-end strategy. Offensive and defensive steps need to be taken to identify mail from know controlled sources and separate them from unknown and open access sources.

Figure 6:
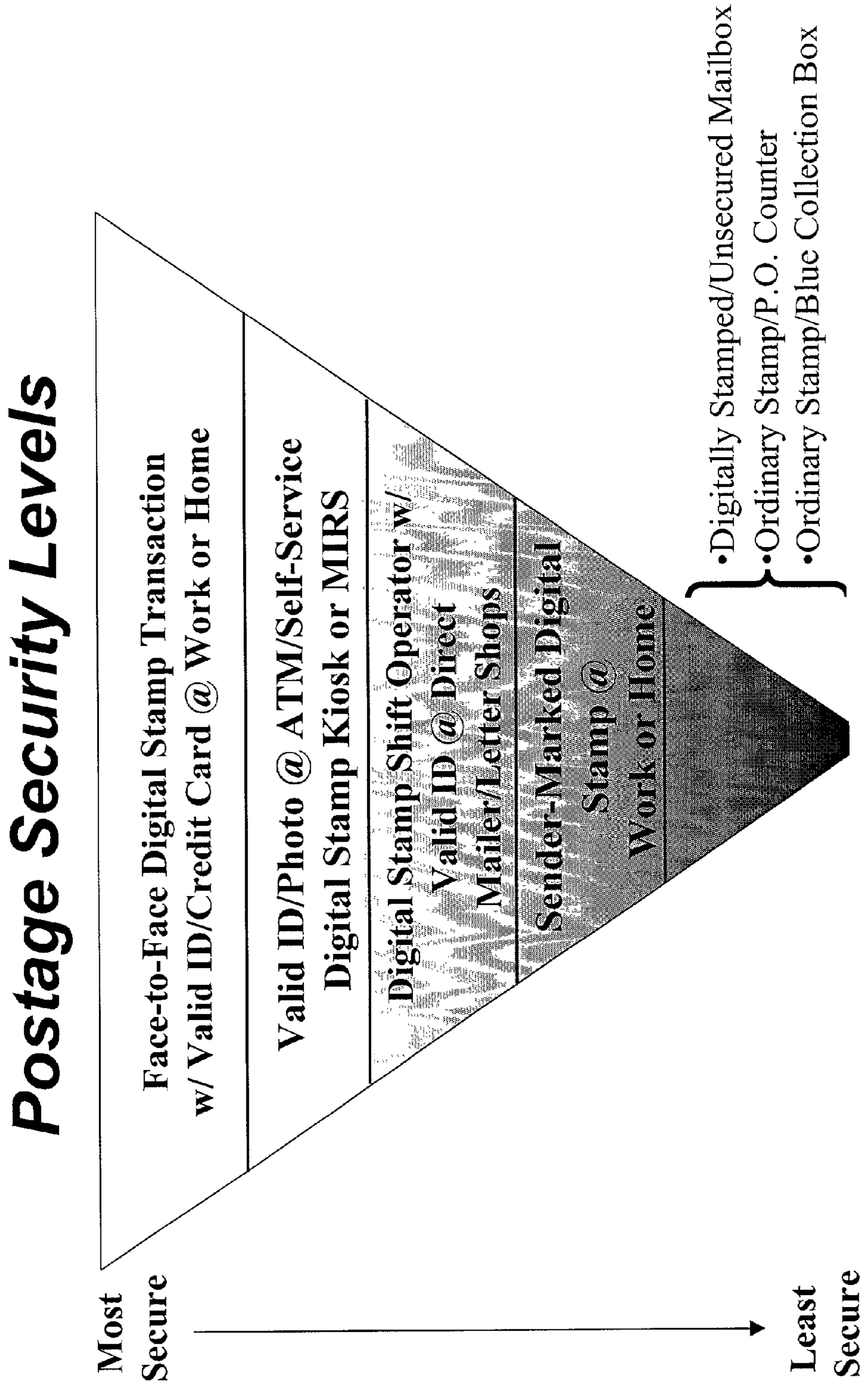
FIG. 6 illustrates a pyramid chart of various levels of security within the mail system that may be used in practicing an embodiment of the present invention.

Turning to FIG. 6, shown is a pyramid illustrating the various levels of security that this system may provide. From most secure to least secure, such security levels are mail that is sent via the following methods:

- Face-to-face digitally stamp transaction with valid credit card
- Valid ID used at a MIRS
- Valid ID used at a direct mailer
- Sender-Marked digital stamp
- All others Using this security pyramid, the Post Office may focus mainly on those pieces of mail that have the most risk to mail security.

Based on the Postal Service's digital stamp technology, encrypted 2D secure digital mail indicia captures a wealth of information about both the point of origin and the sender. It functions like a Caller I.D. program for mail, conveying the 'who, when, and where' of the mailer.

With respect to the usage of secure mail, under currently envisioned applications, virtually everyone would have the option to use secure digital mail. Existing secure digital mail stamps come in the form of on-line downloadable postage available to anyone with a PC and Internet connection. Alternatively, customers or postal carriers could use a mobile computer with an attached printer and credit card reader to print digital stamps. This method is illustrated in FIG. 7. In addition, the MIRS or other kiosks may be used where consumers can buy postage with credit or debit cards. Digital stamps could also be purchased at a local post office just like unsecured ordinary stamps, except they would be printed on demand with both fixed and mobile printers. And, large volume mailers and letter shops could print 2-dimensional barcode digital stamps in much the same way they employ current high-speed printers and postal meters.

Unlike ordinary stamps and other forms of marking, secure, machine-readable portable data file barcode digital stamps can embed additional information such as the name of the sender (individual or corporate operator); the point of origin (home address or mailer ID); computer/printer serial number ID; credit card number, where applicable; and date/time stamp, tracked with the destination zip code at the delivery processing point. Secure digital mail stamps are printed communications protocols, capable of carrying a kilobyte of data in a square inch, and instantly readable by laser scanning or imaging devices; all commercially available and in use worldwide.

Regarding fraud, since each secure digital mail stamp carries an add-on encrypted digital signature, the USPS processing system can be programmed to isolate duplicates and other forms of fraud for separate review. Linking secure digital mail to valid ID such as driver's licenses and financial mechanisms like credit and debit card creates a highly traceable path for public safety officials to follow.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A method of sending a package, comprising:

scanning a two-dimensional bar code that is associated with the package and presented by an intended receiver of the package, wherein the two-dimensional bar code is electronically transmitted to the intended receiver of the package and the two-dimensional bar code is encoded with previously provided biometric information of the intended receiver;

decoding the two-dimensional bar code to obtain the receiver's previously provided biometric information;

receiving current biometric information from the receiver and comparing the current biometric information to the previously provided biometric information; and providing the package to the receiver if the receiver's current biometric information is equivalent to the receiver's previously provided biometric information.

2. The method of claim 1, wherein the receiver's previously provided biometric information and the receiver's current biometric information include data related to at least one of the receiver's fingerprint, the receiver's handprint, the receiver's voice print, the receiver's facial features, and the receiver's signature.

3. The method of claim 2 wherein receiving the receiver's current biometric information is accomplished by:

affixing the receiver's signature to a signature bar code; and scanning the signature bar code.

4. The method of claim 1, wherein the two-dimensional bar code utilizes the PDF 417 symbology.

5. The method of claim 1, wherein the two-dimensional bar code is scanned using a portable scanner.

6. The method of claim 1, wherein scanning the two-dimensional bar code further comprises:

scanning a printed copy of the electronically transmitted two-dimensional bar code.

7. The method of claim 6, wherein the printed copy of the two-dimensional bar code includes a receipt electronically transmitted to the user to confirm arrival of the package at its intended destination.

8. The method of claim 1, further comprising:

scanning a second two-dimensional bar code that has been associated with the package, wherein the second two-dimensional bar code is a digital stamp applied to the package and encoded with sender information.

9. The method of claim 8, wherein the sender information includes at least one of a credit card account number, sender biometric data, destination address, sender address, sender name, digital signature, and meter information.

10. An apparatus for delivering goods, comprising:

a notification unit for notifying a user electronically that a package has arrived at a predetermined location;

a scanner for scanning a two-dimensional bar code that is associated with the package, wherein the two-dimensional bar code is electronically transmitted to an intended receiver of the package and encodes previously provided biometric information relating to the user's identification;

a decoder for decoding the user's previously provided biometric information from the two-dimensional bar code;

a collector for collecting the user's current biometric information;

a comparator for comparing the user's current biometric information and the previously provided biometric information, the package being provided to the user when the user's current biometric information matches the previously provided biometric information.

11. The apparatus of claim 10, wherein the notifier operates via at least one of a cell phone, a PDA, and a two-way pager.

12. The apparatus of claim 10, further comprising:

a presenting unit for presenting the package for visual inspection by the user prior to providing the package to the user.

13. The apparatus of claim 10, wherein the user's previously provided biometric information and the user's current biometric information include data related to at least one of the user's fingerprint, the user's handprint, the user's voiceprint, the user's facial features, and the user's signature.

14. The apparatus of claim 10, wherein the two-dimensional bar code utilizes the PDF 417 symbology.

15. The apparatus of claim 10, wherein the scanner is a portable scanner.

16. The apparatus of claim 10, wherein the scanner is operable for scanning a printed copy of the two-dimensional bar code.

17. The apparatus of claim 10, further comprising a provider for providing the package to the user.

18. A method of delivering identification data to a user of a package delivery system, comprising:

receiving biometric information and recipient information from a user; and encoding the biometric information into a two-dimensional bar code, the two-dimensional bar code capable of being electronically transmitted and decoded to recover at least the user's received biometric information;

receiving a notification that the user has ordered a package; and in response to the notification, electronically transmitting the two-dimensional bar code to the user.

19. The method of claim 18, wherein the notification that the user has ordered a package is received via the Internet.

20. The method of claim 18, wherein the received biometric information includes data related to at least one of the user's facial features, the user's voiceprint, the user's fingerprint, the user's signature, and the user's handprint.

21. The method as in claim 18, further comprising:

notifying the user electronically that the package has arrived at a location that corresponds with the recipient information, wherein the notification includes the two-dimensional bar code encoding the user's received biometric information.

22. The method of claim 18, wherein receiving data from the user includes receiving data via the Internet.

* * * * *